United States Patent
Hanrahan et al.

(10) Patent No.: US 12,135,076 B1
(45) Date of Patent: Nov. 5, 2024

(54) FLUID DEVICE(S) FOR SUPPORTING ROTATING STRUCTURE(S) OF A TURBINE ENGINE

(71) Applicant: RTX Corporation, Farmington, CT (US)

(72) Inventors: Paul R. Hanrahan, Sedona, AZ (US); Robert G. Murphy, II, New Haven, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/375,065

(22) Filed: Sep. 29, 2023

(51) Int. Cl.
*F16H 57/04* (2010.01)
*F16H 3/44* (2006.01)

(52) U.S. Cl.
CPC ............ *F16H 57/042* (2013.01); *F16H 3/44* (2013.01)

(58) Field of Classification Search
CPC .... F16H 57/042; F16H 3/44; F16H 2003/442; F16H 57/0424; F16H 57/043; F16H 57/0426
See application file for complete search history.

(56) References Cited

U.S. PATENT DOCUMENTS

| | | | |
|---|---|---|---|
| 3,678,690 A | 7/1972 | Shohet | |
| 4,651,521 A | 3/1987 | Ossi | |
| 4,791,783 A | 12/1988 | Neitzel | |
| 4,936,748 A | 6/1990 | Adamson | |
| 4,997,414 A | 3/1991 | Camara | |
| 5,209,428 A | 5/1993 | Bevilaqua | |
| 5,452,988 A | 9/1995 | Short | |
| 6,148,605 A | 11/2000 | Lardellier | |
| 6,269,627 B1 | 8/2001 | Freese | |
| 6,270,037 B1 | 8/2001 | Freese | |

(Continued)

FOREIGN PATENT DOCUMENTS

| CN | 111279060 B | 3/2023 |
|---|---|---|
| CN | 107856488 B | 12/2023 |

(Continued)

OTHER PUBLICATIONS

"Overview of Variable-Speed Power-Turbine Research", https://core.ac.uk/download/pdf/10560017.pdf, Aug. 30, 2019.

(Continued)

*Primary Examiner* — Jacob S. Scott
*Assistant Examiner* — Farhana Pervin
(74) *Attorney, Agent, or Firm* — Getz Balich LLC

(57) ABSTRACT

An engine assembly is provided that includes a geartrain, a rotating structure and a support structure. The geartrain includes a sun gear, a ring gear, a plurality of intermediate gears and a carrier. The intermediate gears are arranged circumferentially about the axis in an array. Each of the intermediate gears are radially between and meshed with the sun gear and the ring gear. Each of the intermediate gears is rotatably mounted to the carrier. The carrier is rotatable about the axis. The rotating structure forms the carrier. The rotating structure includes a shaft and a rotating structure passage. The support structure circumscribes the shaft with a plenum formed by and radially between the support structure and the shaft. The support structure includes a support structure passage. The plenum fluidly couples the support structure passage to the rotating structure passage.

20 Claims, 11 Drawing Sheets

(56) References Cited

U.S. PATENT DOCUMENTS

| | | | |
|---|---|---|---|
| 7,481,062 B2 | 1/2009 | Gaines | |
| 8,083,030 B2 * | 12/2011 | Portlock | F01D 5/022 |
| | | | 475/159 |
| 8,777,793 B2 | 7/2014 | Sheridan | |
| 8,813,469 B2 | 8/2014 | Sheridan | |
| 9,017,028 B2 | 4/2015 | Fabre | |
| 9,695,710 B2 | 7/2017 | Mccune | |
| 10,138,757 B2 | 11/2018 | Witlicki | |
| 10,215,054 B2 | 2/2019 | Anglin | |
| 10,302,187 B2 | 5/2019 | Lao | |
| 10,337,409 B2 | 7/2019 | Bedrine | |
| 10,494,998 B2 * | 12/2019 | McCune | F16H 57/043 |
| 10,578,028 B2 | 3/2020 | Becker, Jr. | |
| 10,663,054 B2 | 5/2020 | Gravina | |
| 10,669,946 B2 | 6/2020 | Sheridan | |
| 10,822,101 B2 | 11/2020 | Murrow | |
| 10,876,411 B2 | 12/2020 | Ramirez | |
| 10,914,234 B1 | 2/2021 | O'Flarity | |
| 10,954,813 B2 | 3/2021 | Wuestenberg | |
| 10,968,748 B2 | 4/2021 | Ramirez | |
| 11,015,533 B2 | 5/2021 | Sheridan | |
| 11,060,587 B1 | 7/2021 | Kobayashi | |
| 11,073,160 B2 | 7/2021 | Murugan | |
| 11,077,949 B2 | 8/2021 | Behrens | |
| 11,112,001 B2 * | 9/2021 | Dombek | F16H 57/0431 |
| 11,168,616 B2 | 11/2021 | Kupratis | |
| 11,186,378 B2 | 11/2021 | Dubreuil | |
| 11,199,103 B2 | 12/2021 | Wolfer | |
| 11,549,582 B2 | 1/2023 | Simon | |
| 11,745,888 B2 | 9/2023 | Harvey | |
| 11,815,145 B2 | 11/2023 | Huschenhoefer | |
| 11,891,967 B2 | 2/2024 | Yesilcimen | |
| 2003/0049118 A1 | 3/2003 | Bruno | |
| 2009/0320491 A1 | 12/2009 | Copeland | |
| 2012/0133155 A1 | 5/2012 | Sorg | |
| 2012/0177493 A1 | 7/2012 | Fabre | |
| 2014/0010652 A1 | 1/2014 | Suntharalingam | |
| 2014/0290265 A1 | 10/2014 | Ullyott | |
| 2014/0364265 A1 | 12/2014 | Bentgen | |
| 2015/0011354 A1 | 1/2015 | Fabre | |
| 2015/0274287 A1 | 10/2015 | Robertson | |
| 2016/0076393 A1 | 3/2016 | Sheridan | |
| 2016/0185460 A1 | 6/2016 | Cedoz | |
| 2016/0195096 A1 * | 7/2016 | Otto | F01D 5/02 |
| | | | 415/122.1 |
| 2016/0229531 A1 | 8/2016 | Robertson | |
| 2016/0363211 A1 * | 12/2016 | Bradley | F16H 57/0427 |
| 2017/0051679 A1 | 2/2017 | Becker, Jr. | |
| 2018/0009536 A1 | 1/2018 | Christopherson | |
| 2018/0135512 A1 | 5/2018 | Poulin | |
| 2018/0266316 A1 | 9/2018 | Soulat | |
| 2018/0328289 A1 | 11/2018 | Madge | |
| 2019/0061924 A1 | 2/2019 | Kita | |
| 2019/0170240 A1 * | 6/2019 | Charrier | F16H 57/0482 |
| 2019/0382123 A1 | 12/2019 | Schwarz | |
| 2020/0017229 A1 | 1/2020 | Steinert | |
| 2020/0032893 A1 * | 1/2020 | Simon | F16H 1/2863 |
| 2020/0070990 A1 | 3/2020 | Harvey | |
| 2020/0088053 A1 | 3/2020 | Fiore | |
| 2020/0108937 A1 | 4/2020 | Behrens | |
| 2020/0182158 A1 | 6/2020 | Kupratis | |
| 2020/0191062 A1 | 6/2020 | Sheridan | |
| 2020/0240427 A1 | 7/2020 | Teuber | |
| 2020/0263784 A1 * | 8/2020 | Simon | F16H 57/0486 |
| 2020/0284164 A1 * | 9/2020 | Gebhard | F16H 57/0424 |
| 2020/0284195 A1 * | 9/2020 | Gebhard | F02C 7/36 |
| 2020/0307812 A1 | 10/2020 | Dubreuil | |
| 2020/0307818 A1 | 10/2020 | Dubreuil | |
| 2020/0340406 A1 | 10/2020 | Maljean | |
| 2020/0354068 A1 | 11/2020 | Razak | |
| 2020/0400077 A1 | 12/2020 | Redford | |
| 2021/0054784 A1 | 2/2021 | O'Flarity | |
| 2021/0078700 A1 | 3/2021 | Klemen | |
| 2021/0087977 A1 | 3/2021 | Becoulet | |
| 2021/0179286 A1 | 6/2021 | Harvey | |
| 2021/0229796 A1 | 7/2021 | Mitrovic | |
| 2021/0317800 A1 | 10/2021 | Yesilcimen | |
| 2021/0341049 A1 * | 11/2021 | Sheridan | F16H 57/046 |
| 2022/0235699 A1 | 7/2022 | Desjardins | |
| 2022/0252009 A1 * | 8/2022 | Polly | F02C 7/06 |
| 2023/0069754 A1 * | 3/2023 | Uhkötter | F16H 57/0426 |
| 2023/0228216 A1 | 7/2023 | Miller | |
| 2023/0228231 A1 | 7/2023 | Miller | |
| 2023/0358178 A1 * | 11/2023 | Desjardins | F02K 3/06 |
| 2023/0382548 A1 | 11/2023 | Hanrahan | |
| 2023/0382549 A1 | 11/2023 | Hanrahan | |
| 2023/0383700 A1 | 11/2023 | Hanrahan | |
| 2024/0052784 A1 | 2/2024 | Hanrahan | |
| 2024/0060453 A1 | 2/2024 | Hanrahan | |
| 2024/0077033 A1 | 3/2024 | Hanrahan | |
| 2024/0077034 A1 | 3/2024 | Hanrahan | |

FOREIGN PATENT DOCUMENTS

| | | |
|---|---|---|
| DE | 1119675 B | 12/1961 |
| EP | 2535528 B1 | 4/2021 |
| GB | 1439988 A | 6/1976 |
| WO | 2016090390 A1 | 6/2016 |
| WO | 2022195217 A1 | 9/2022 |

OTHER PUBLICATIONS

"Overview of Variable-Speed Power-Turbine Research", https://www.science.gov/topicpages/v/variable-speed+power+turbine, Jan. 1, 2011.

"RVLT TC1.1: Variable Speed Power Turbine Tech Demo", https://techport.nasa.gov/view/93071, Jul. 21, 2021.

Ashlie Flegel, "Aerodynamic Measurements of a Variable-Speed Power-Turbine Blade Section in a Transonic Turbine Cascade" https://engagedscholarship.csuohio.edu/cgi/viewcontent.cgi?article=1852&context=etdarchive, May 2007.

Flegel-McVetta et al. "Aerodynamic Measurements of a Variable-Speed Power-Turbine Blade Section in a Transonic Turbine Cascade at Low Inlet Turbulence", NASA/TM-2013-218069, Aug. 2013.

* cited by examiner

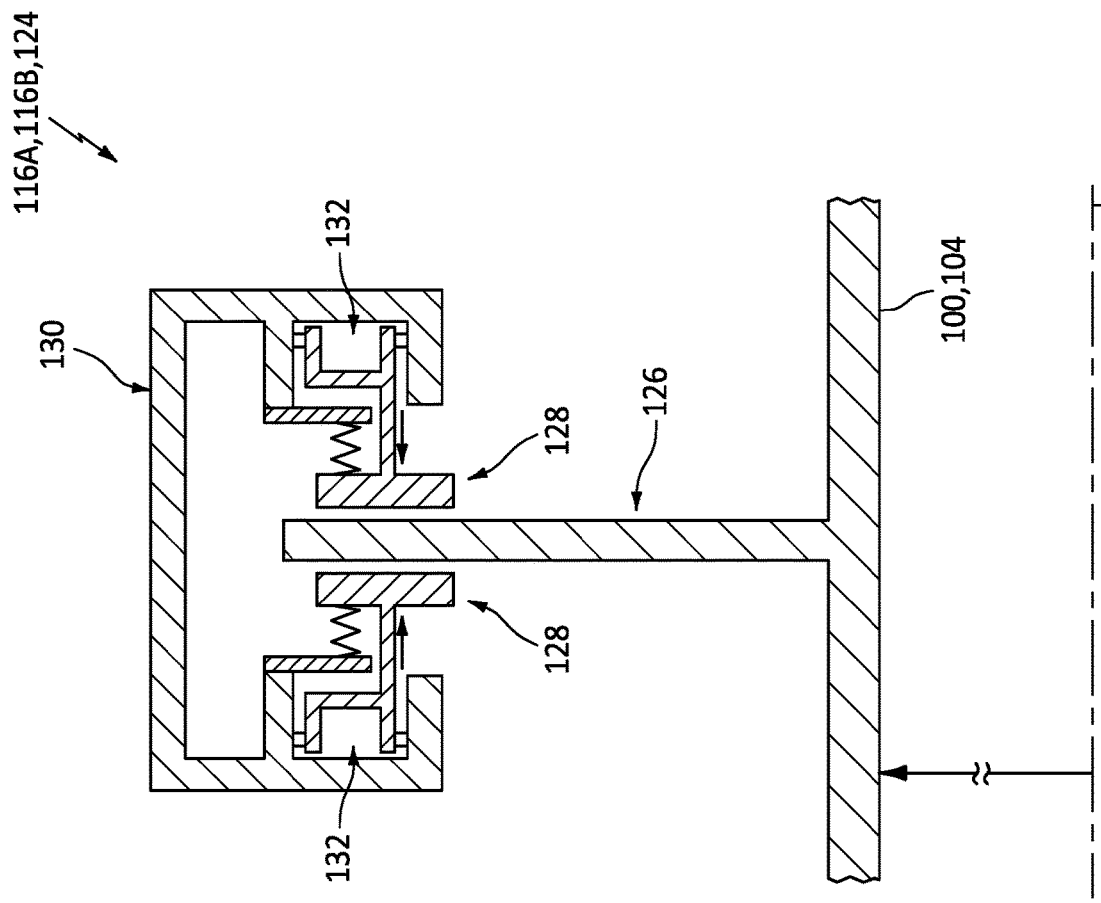

FLUID DEVICE(S) FOR SUPPORTING ROTATING STRUCTURE(S) OF A TURBINE ENGINE

BACKGROUND OF THE DISCLOSURE

1. Technical Field

This disclosure relates generally to a turbine engine and, more particularly, to a geartrain for the turbine engine.

2. Background Information

Various types and configurations of geartrains and support systems for geartrains for an aircraft propulsion system are known in the art. While these known aircraft propulsion system geartrains and support systems have various benefits, there is still room in the art for improvement.

SUMMARY OF THE DISCLOSURE

According to an aspect of the present disclosure, an engine assembly is provided that includes a geartrain, a rotating structure and a support structure. The geartrain includes a sun gear, a ring gear, a plurality of intermediate gears and a carrier. The sun gear is rotatable about an axis. The ring gear is rotatable about the axis and circumscribes the sun gear. The intermediate gears are arranged circumferentially about the axis in an array. Each of the intermediate gears are radially between and meshed with the sun gear and the ring gear. Each of the intermediate gears is rotatably mounted to the carrier. The carrier is rotatable about the axis. The rotating structure forms the carrier. The rotating structure includes a shaft and a rotating structure passage. The support structure circumscribes the shaft with a plenum formed by and radially between the support structure and the shaft. The support structure includes a support structure passage. The plenum fluidly couples the support structure passage to the rotating structure passage.

According to another aspect of the present disclosure, another engine assembly is provided that includes a geartrain, a first rotating structure, a first support structure, a second rotating structure and a second support structure. The first rotating structure is rotatable about an axis. The first rotating structure forms a first component of the geartrain. The first rotating structure includes a first rotating structure passage. The first support structure circumscribes the first rotating structure with a first plenum formed by and radially between the first support structure and the first rotating structure. The first support structure includes a first support structure passage. The first plenum fluidly couples the first support structure passage to the first rotating structure passage. The second rotating structure is rotatable about the axis. The second rotating structure forms a second component of the geartrain. The second rotating structure includes a second rotating structure passage. The second support structure circumscribes the second rotating structure with a second plenum formed by and radially between the second support structure and the second rotating structure. The second support structure includes a second support structure passage. The second plenum fluidly couples the second support structure passage to the second rotating structure passage.

According to still another aspect of the present disclosure, another engine assembly is provided that includes a geartrain, a rotating structure, a support structure and a lubricant circuit. The geartrain is configured as or otherwise includes an epicyclic gear system. The rotating structure is rotatable about an axis. The rotating structure forms a first component of the epicyclic gear system. The rotating structure includes a rotating structure passage. The support structure circumscribes the rotating structure with a plenum formed by and radially between the support structure and the rotating structure. The support structure includes a support structure passage. The plenum fluidly couples the support structure passage to the rotating structure passage. The lubricant circuit is configured to deliver lubricant to the epicyclic gear system. The lubricant circuit includes the support structure passage, the plenum and the rotating structure passage.

The first component of the geartrain may be configured as or otherwise include a carrier of the geartrain. In addition or alternatively, the second component of the geartrain may be configured as or otherwise include a ring gear of the geartrain.

The geartrain may be configured as or otherwise include an epicyclic gear system.

The geartrain may be configured as or otherwise include a plurality of interconnected gear systems.

The engine assembly may also include a lubricant circuit configured to deliver lubricant to the geartrain. The lubricant circuit may include the support structure passage, the plenum and the rotating structure passage.

The engine assembly may also include a lubricant circuit coupled to the support structure. The lubricant circuit may be configured to direct lubricant through the support structure passage and the plenum into the rotating structure passage.

The support structure may be configured as a fluid damper for the shaft.

The engine assembly may also include a journal bearing including the shaft and the support structure.

The engine assembly may also include a first seal element and a second seal element. The first seal element may be radially between and engage the shaft and the support structure. The second seal element may be radially between and engage the shaft and the support structure. The plenum may extend axially between the first seal element and the second seal element.

The plenum may be configured as or otherwise include an annular channel radially outboard and adjacent the shaft. The annular channel may extend radially into and axially within the support structure.

The engine assembly may also include a stationary structure. The support structure may be connected to the stationary structure through a compliant coupling.

The compliant coupling may be configured to facilitate radial shifting between the support structure and the stationary structure.

The support structure may have a support structure axial length. The shaft may have a shaft axial length that is equal to or less than three times the support structure axial length.

A portion of the shaft which projects axially away from the support structure to a distal end of the shaft may be rotationally unsupported.

A portion of the shaft axially between the support structure and the carrier may be rotationally unsupported.

The engine assembly may also include a second rotating structure and a second support structure. The second rotating structure may form the ring gear. The second rotating structure may include a second rotating structure passage. The second support structure may circumscribe the second rotating structure with a second plenum formed by and radially between the second support structure and the second rotating structure. The second support structure may include a second support structure passage. The second plenum may fluidly couple the second support structure passage to the second rotating structure passage.

During one mode of operation, the second rotating structure and the second rotating structure passage may be configured to rotate about the axis while the first rotating structure and the first rotating structure passage are stationary. In addition or alternatively, during another mode of operation, the first rotating structure and the first rotating structure passage may be configured to rotate about the axis while the second rotating structure and the second rotating structure passage are stationary.

The geartrain may include a second sun gear, a second ring gear, a plurality of second intermediate gears and a second carrier. The second sun gear may be rotatable about the axis. The second ring gear may be rotatable about the axis and may circumscribe the second sun gear. The second intermediate gears may be arranged circumferentially about the axis in a second array. Each of the second intermediate gears may be radially between and meshed with the second sun gear and the second ring gear. The second carrier may be rotatable about the axis. Each of the second intermediate gears may be rotatably mounted to the second carrier. The second rotating structure may form the second carrier.

The engine assembly may also include a lubricant circuit configured to deliver lubricant to the geartrain. The lubricant circuit may include the second support structure passage, the second plenum and the second rotating structure passage.

The engine assembly may also include a propulsor rotor and a rotating assembly.

The rotating assembly may include a turbine rotor. The rotating assembly may be configured to drive rotation of the propulsor rotor through the geartrain.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 6 is a partial, side sectional illustration of a rotating assembly configured with a brake.

DETAILED DESCRIPTION

Figure 1:
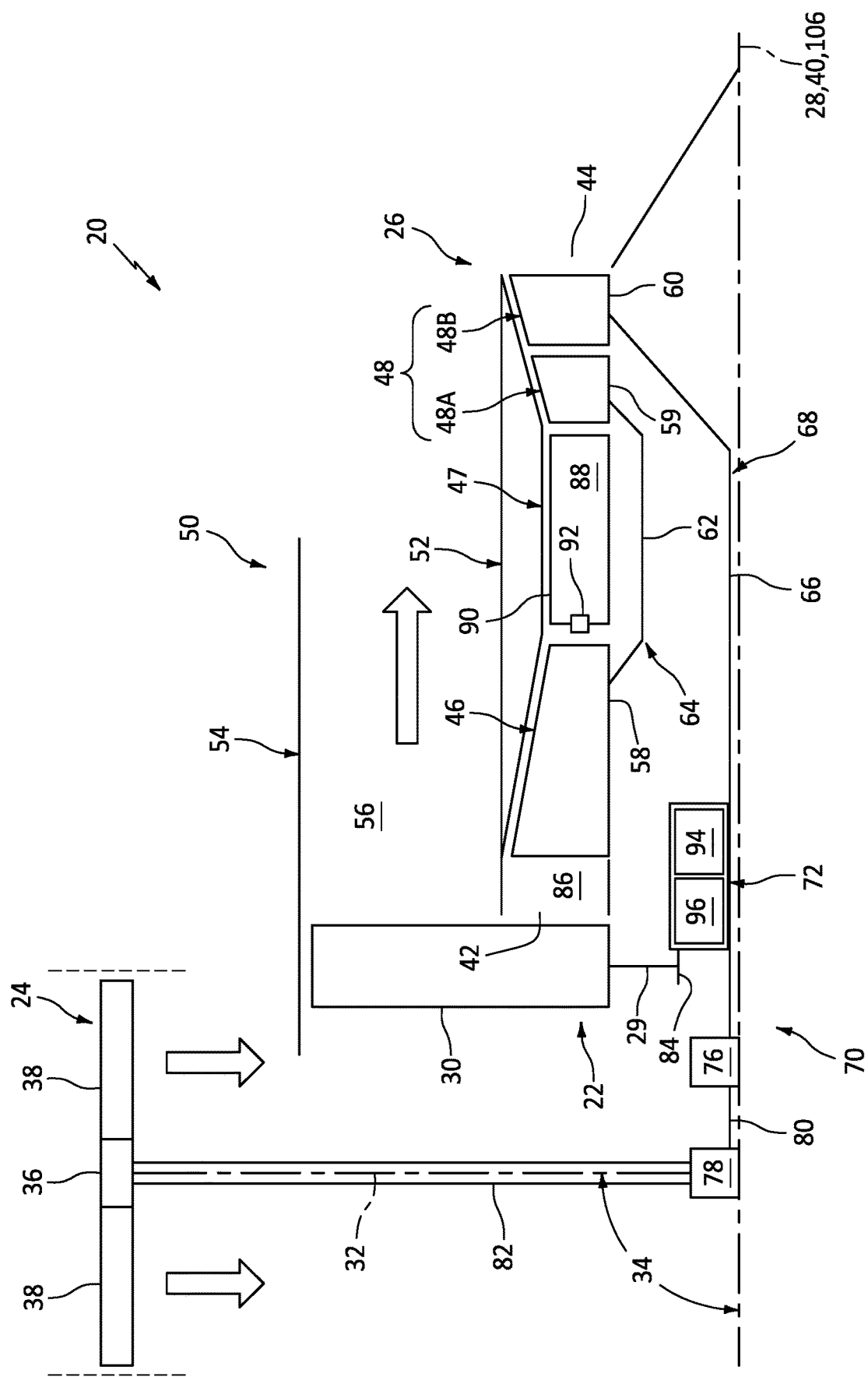
FIG. 1 is a partial, schematic illustration of an aircraft propulsion system.

FIG. 1 schematically illustrates a propulsion system 20 for an aircraft. The aircraft may be an airplane, a helicopter, a drone (e.g., an unmanned aerial vehicle (UAV)), a spacecraft or any other manned or unmanned aerial vehicle or system. This aircraft may be configured as a vertical take-off and landing (VTOL) aircraft or a short take-off and vertical landing (STOVL) aircraft. The aircraft propulsion system 20 of FIG. 1, for example, is configured to generate power for first direction propulsion (e.g., propulsive thrust) during a first mode of operation and to generate power for second direction propulsion (e.g., propulsive lift) during a second mode of operation, where the first direction is different than (e.g., angularly offset from) the second direction. The first mode may be a horizontal flight mode (e.g., a forward flight mode) where the first direction propulsion is substantially horizontal propulsive thrust; e.g., within five degrees (5°), ten degrees (10°), etc. of a horizontal axis. The second mode may be a vertical flight and/or hover mode where the second direction propulsion is substantially vertical propulsive lift; e.g., within five degrees (5°), ten degrees (10°), etc. of a vertical axis. The aircraft propulsion system 20, of course, may also be configured to generate both the first direction propulsion (e.g., horizontal propulsion) and the second direction propulsion (e.g., vertical propulsion) during a third mode (e.g., a transition mode) of operation.

The aircraft propulsion system 20 of FIG. 1 includes one or more bladed propulsor rotors such as, for example, at least one bladed first propulsor rotor 22 and at least one bladed second propulsor rotor 24. The aircraft propulsion system 20 of FIG. 1 also includes a gas turbine engine with a core 26 configured to rotatably drive the one or more propulsor rotors—the first propulsor rotor 22 and/or the second propulsor rotor 24.

The first propulsor rotor 22 may be configured as a ducted rotor such as a fan rotor. Of course, in other embodiments, the first propulsor rotor 22 may alternatively be configured as an open rotor (e.g., an un-ducted rotor) such as a propeller rotor, a pusher fan rotor or the like. The first propulsor rotor 22 of FIG. 1 is rotatable about a first rotor axis 28. This first rotor axis 28 is an axial centerline of the first propulsor rotor 22 and may be horizontal when the aircraft is on ground and/or during level aircraft flight. The first propulsor rotor 22 includes at least a first rotor disk 29 (or a hub) and a plurality of first rotor blades 30 (one visible in FIG. 1); e.g., fan blades. The first rotor blades 30 are distributed circumferentially around the first rotor disk 29 in an annular array. Each of the first rotor blades 30 is connected to and projects radially (relative to the first rotor axis 28) out from the first rotor disk 29.

The second propulsor rotor 24 may be configured as an open rotor such as a propeller rotor or a helicopter (e.g., main) rotor. Of course, in other embodiments, the second propulsor rotor 24 may alternatively be configured as a ducted rotor such as a fan rotor; e.g., see dashed line duct. The second propulsor rotor 24 of FIG. 1 is rotatable about a second rotor axis 32. This second rotor axis 32 is an axial centerline of the second propulsor rotor 24 and may be vertical when the aircraft is on the ground and/or during level aircraft flight. The second rotor axis 32 is angularly offset from the first rotor axis 28 by an included angle 34; e.g., an acute angle or a right angle. This included angle 34 may be between sixty degrees(60°) and ninety degrees (90°); however, the present disclosure is not limited to such an exemplary relationship. The second propulsor rotor 24 includes at least a second rotor disk 36 (or a hub) and a plurality of second rotor blades 38; e.g., open rotor blades. The second rotor blades 38 are distributed circumferentially around the second rotor disk 36 in an annular array. Each of the second rotor blades 38 is connected to and projects radially (relative to the second rotor axis 32) out from the second rotor disk 36.

The engine core 26 extends axially along a core axis 40 from a forward, upstream airflow inlet 42 into the engine core 26 to an aft, downstream combustion products exhaust 44 from the engine core 26. The core axis 40 may be an axial centerline of the engine core 26 and may be horizontal when the aircraft is on the ground and/or during level aircraft flight. This core axis 40 may be parallel (e.g., coaxial) with the first rotor axis 28 and, thus, angularly offset from the second rotor axis 32. The engine core 26 of FIG. 1 includes a compressor section 46, a combustor section 47 and a turbine section 48. The turbine section 48 of FIG. 1 includes a high pressure turbine (HPT) section 48A and a low pressure turbine (LPT) section 48B (also sometimes referred to as a power turbine section).

The engine sections 46-48B may be arranged sequentially along the core axis 40 within an engine housing 50. This engine housing 50 includes an inner case 52 (e.g., a core case) and an outer case 54 (e.g., a fan case). The inner case 52 may house one or more of the engine sections 46-48B; e.g., the engine core 26. The outer case 54 may house the first propulsor rotor 22. The outer case 54 of FIG. 1 also axially overlaps and extends circumferentially about (e.g., completely around) the inner case 52 thereby at least partially forming a (e.g., annular) bypass flowpath 56 radially between the inner case 52 and the outer case 54.

Each of the engine sections 46, 48A, 48B includes a bladed rotor 58-60 within that respective engine section 46, 48A, 48B. Each of these engine rotors 58-60 includes a plurality of rotor blades arranged circumferentially around and connected to one or more respective rotor disks (or hubs). The rotor blades, for example, may be formed integral with or mechanically fastened, welded, brazed and/or otherwise attached to the respective rotor disk(s) (or hub(s)).

The compressor rotor 58 is connected to the HPT rotor 59 through a high speed shaft 62. At least (or only) these engine components 58, 59 and 62 collectively form a high speed rotating assembly 64; e.g., a high speed spool. This high speed rotating assembly 64 is rotatable about the core axis 40. The LPT rotor 60 is connected to a low speed shaft 66. At least (or only) these engine components 60 and 66 collectively form a low speed rotating assembly 68; e.g., a low speed spool. This low speed rotating assembly 68 is rotatable about the core axis 40. The low speed rotating assembly 68 and, more particularly, its low speed shaft 66 may project axially through a bore of the high speed rotating assembly 64 and its high speed shaft 62.

The aircraft propulsion system 20 of FIG. 1 and its turbine engine include a drivetrain 70 that couples the low speed rotating assembly 68 to the first propulsor rotor 22 and that couples the low speed rotating assembly 68 to the second propulsor rotor 24. The drivetrain 70 of FIG. 1 includes a geartrain 72, a transmission 76 and a gearing 78; e.g., bevel gearing. The drivetrain 70 of FIG. 1 also includes one or more shafts 80 and 82 and/or other intermediate torque transmission devices for coupling the low speed rotating assembly 68 and its low speed shaft 66 to the second propulsor rotor 24. The drivetrain 70 may also include one or more intermediate torque transmission devices for coupling the geartrain 72 to the first propulsor rotor 22; e.g., a first propulsor shaft 84.

An input into the geartrain 72 is coupled to the low speed rotating assembly 68 and its low speed shaft 66, where the low speed rotating assembly 68 forms a power input for the geartrain 72. An output from the geartrain 72 is coupled to the first propulsor rotor 22 through the first propulsor shaft 84, where the first propulsor rotor 22 forms a power output (e.g., load) for the geartrain 72.

An input into the transmission 76 may be coupled to the low speed rotating assembly 68 independent of the geartrain 72. The low speed rotating assembly 68, for example, may be coupled to the input of the geartrain 72 and the input of the transmission 76 in parallel. The input of the transmission 76 of FIG. 1, in particular, is (e.g., directly or indirectly) connected to the LPT rotor 60 through the low speed shaft 66; e.g., without passing through the geartrain 72. An output from the transmission 76 is connected to an input into the gearing 78 through the transmission output shaft 80.

The transmission 76 may be configured to selectively couple (e.g., transfer mechanical power between) the low speed rotating assembly 68 and the transmission output shaft 80. During the first mode of operation, for example, the transmission 76 may be configured to decouple the low speed rotating assembly 68 from the transmission output shaft 80, thereby decoupling the low speed rotating assembly 68 from the second propulsor rotor 24. During the second mode of operation (and the third mode of operation), the transmission 76 may be configured to couple the low speed rotating assembly 68 with the transmission output shaft 80, thereby coupling the low speed rotating assembly 68 with the second propulsor rotor 24. The transmission 76 may be configured as a clutched transmission or a clutchless transmission.

An output from the gearing 78 is connected to the second propulsor rotor 24 through the second propulsor shaft 82. This gearing 78 provides a coupling between the transmission output shaft 80 rotating about the axis 28, 40 and the second propulsor shaft 82 rotating about the second rotor axis 32. The gearing 78 may also provide a speed change mechanism between the transmission output shaft 80 and the second propulsor shaft 82. The gearing 78, however, may alternatively provide a 1:1 rotational coupling between the transmission output shaft 80 and the second propulsor shaft 82 such that these shafts 80 and 82 rotate at a common (e.g., the same) rotational velocity. Furthermore, in some embodiments, the gearing 78 and the transmission output shaft 80 may be omitted where the functionality of the gearing 78 is integrated into the transmission 76. In still other embodiments, the transmission 76 may be omitted where decoupling of the second propulsor rotor 24 is not required and/or where an optional additional speed change between the low speed rotating assembly 68 and the second propulsor rotor 24 is not required.

During operation of the aircraft propulsion system 20, air enters the engine core 26 through the core inlet 42. This air is directed into a (e.g., annular) core flowpath 86, which core flowpath 86 extends sequentially through the compressor section 46, the combustor section 47, the HPT section 48A and the LPT section 48B from the core inlet 42 to the core exhaust 44. The air within this core flowpath 86 may be referred to as core air.

The core air is compressed by the compressor rotor 58 and directed into a (e.g., annular) combustion chamber 88 of a (e.g., annular) combustor 90 in the combustor section 47. Fuel is injected into the combustion chamber 88 through one or more fuel injectors 92 (one visible in FIG. 1) and mixed with the compressed core air to provide a fuel-air mixture. This fuel-air mixture is ignited and combustion products thereof flow through and sequentially cause the HPT rotor 59 and the LPT rotor 60 to rotate. The rotation of the HPT rotor 59 drives rotation of the high speed rotating assembly 64 and its compressor rotor 58. The rotation of the LPT rotor 60 drives rotation of the low speed rotating assembly 68. The rotation of the low speed rotating assembly 68 drives rotation of the first propulsor rotor 22 through the geartrain 72 during one or more modes of operation; e.g., the first, the second and the third modes of operation. The rotation of the low speed rotating assembly 68 drives rotation of the second propulsor rotor 24 (e.g., independent of the geartrain 72) during one or more modes of operation; e.g., the second and the third modes of operation. During the first mode of operation, the transmission 76 may decouple the low speed rotating assembly 68 from the second propulsor rotor 24 such that the low speed rotating assembly 68 does not drive rotation of the second propulsor rotor 24. The second propulsor rotor 24 may thereby be stationary (or windmill) during the first mode of operation.

During the first and the third modes of operation, the rotation of the first propulsor rotor 22 propels bypass air (separate from the core air) through the aircraft propulsion system 20 and its bypass flowpath 56 to provide the first direction propulsion; e.g., the forward, horizontal thrust. During the second and the third modes of operation, the rotation of the second propulsor rotor 24 propels additional air (separate from the core air and the bypass air) to provide the second direction propulsion; e.g., vertical lift. The aircraft may thereby takeoff, land and/or otherwise hover during the second and the third modes of operation, and the aircraft may fly forward or otherwise move during the first and the third modes of operation. The bypass air may also flow through the bypass flowpath 56 during the second and the third modes of operation; however, a quantity of the bypass air flowing through the bypass flowpath 56 during the second mode of operation may be de minimis as described below in further detail.

Figure 2:
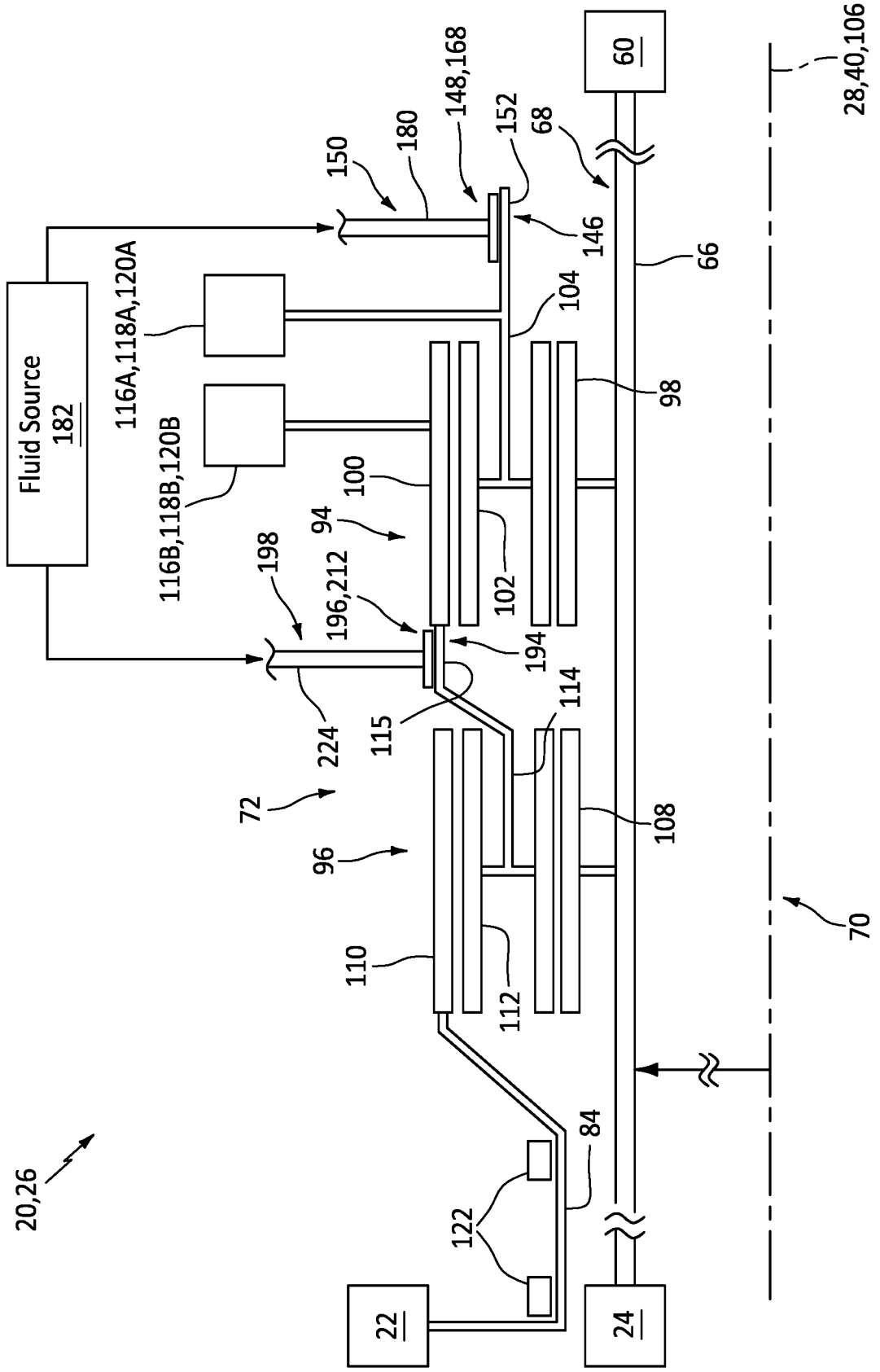
FIG. 2 is a schematic illustration of a portion of a drivetrain with a geartrain.
Figure 3:
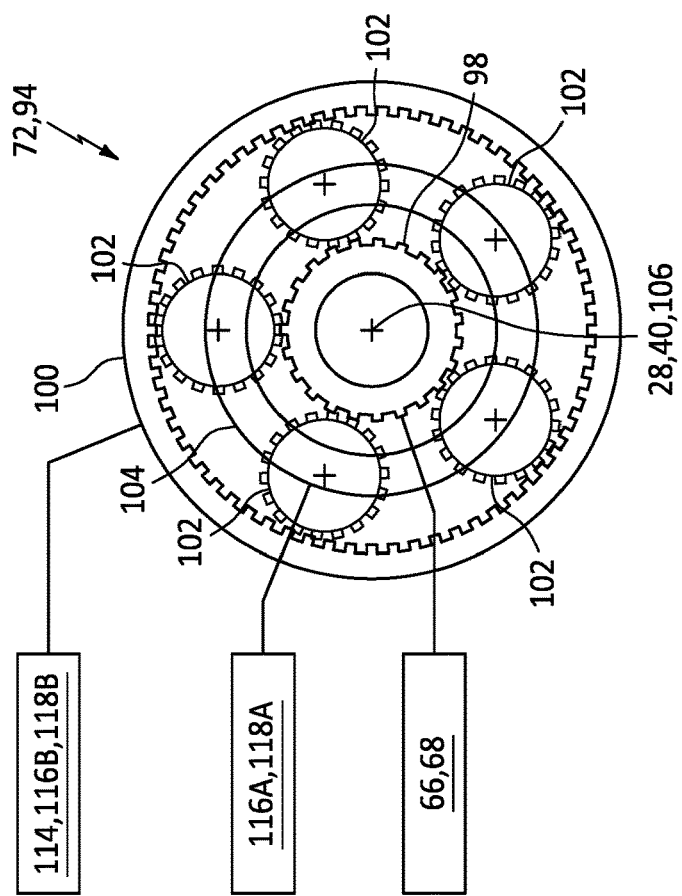
FIG. 3 is a schematic illustration of a first gear system of the geartrain coupled with various components of the aircraft propulsion system.

Referring to FIG. 2, the geartrain 72 may include multiple (e.g., epicyclic) interconnected gear systems 94 and 96. Referring to FIGS. 2 and 3, the first gear system 94 has a plurality of first gear system components including a first sun gear 98, a first ring gear 100, a plurality of first intermediate gears 102 and a first carrier 104. The first sun gear 98 is rotatable about a rotational axis 106 of the geartrain 72, which rotational axis 106 may be parallel (e.g., coaxial) with the axis 28, 40. The first ring gear 100 circumscribes the first sun gear 98 and the first intermediate gears 102. The first ring gear 100 is rotatable about the axis 28, 40, 106. The first intermediate gears 102 are arranged circumferentially about the axis 28, 40, 106 and the first sun gear 98 in an array. Each of the first intermediate gears 102 is disposed radially between and meshed with the first sun gear 98 and the first ring gear 100. Each of the first intermediate gears 102 is rotatably mounted to the first carrier 104. The first carrier 104 is rotatable about the axis 28, 40, 106.

Figure 4:
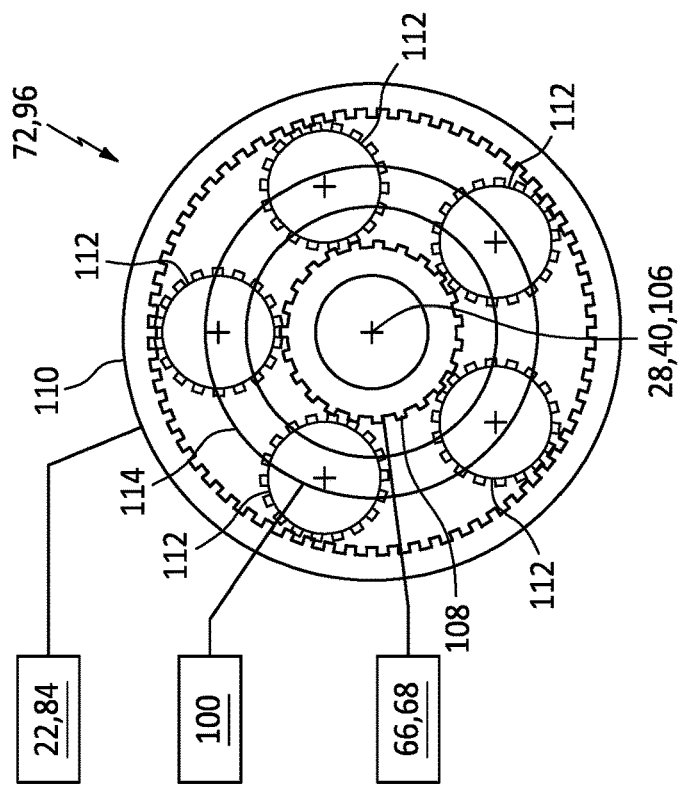
FIG. 4 is a schematic illustration of a second gear system of the geartrain coupled with various components of the aircraft propulsion system.

Referring to FIGS. 2 and 4, the second gear system 96 has a plurality of second gear system components including a second sun gear 108, a second ring gear 110, a plurality of second intermediate gears 112 and a second carrier 114. The second sun gear 108 is rotatable about the axis 28, 40, 106. The second ring gear 110 circumscribes the second sun gear 108 and the second intermediate gears 112. The second ring gear 110 is rotatable about the axis 28, 40, 106. The second intermediate gears 112 are arranged circumferentially about the axis 28, 40, 106 and the second sun gear 108 in an array. Each of the second intermediate gears 112 is disposed radially between and meshed with the second sun gear 108 and the second ring gear 110. Each of the second intermediate gears 112 is rotatably mounted to the second carrier 114. The second carrier 114 is rotatable about the axis 28, 40, 106. This second carrier 114 of FIG. 2 is coupled to (e.g., via an inter-gear system shaft 115 and/or another drive element) and rotatable with the first ring gear 100, where the second carrier 114 and the first ring gear 100 are configured to rotate at a common rotational velocity.

The first propulsor rotor 22 is coupled to the geartrain 72 and its second gear system 96 through the second ring gear 110. The first propulsor shaft 84 (and/or another drive element), for example, may couple the first propulsor rotor 22 to the second ring gear 110. The first propulsor shaft 84 of FIG. 2 extends between and is connected to the first propulsor rotor 22 and the second ring gear 110. The low speed rotating assembly 68 and its low speed shaft 66 are coupled to the geartrain 72 and its first gear system 94 through the first sun gear 98. The low speed rotating assembly 68 and its low speed shaft 66 are also coupled to the geartrain 72 and its second gear system 96 through the second sun gear 108. The first sun gear 98 and the second sun gear 108 of FIG. 2, for example, are each (e.g., independently) connected to the low speed rotating assembly 68 and its low speed shaft 66. With such an arrangement, the low speed rotating assembly 68 and its LPT rotor 60 are configured to (e.g., independently) drive rotation of the first sun gear 98 and the second sun gear 108, where the first sun gear 98, the second sun gear 108 and the LPT rotor 60 are rotate at a common rotational velocity.

The aircraft propulsion system 20 and its drivetrain 70 may include one or more brakes 116A and 116B (generally referred to as "116") and/or one or more lock devices 118A and 118B (generally referred to as "118"). The first brake 116A and/or the first lock device 118A may be located at a first location 120A, or another suitable location. The second brake 116B and/or the second lock device 118B may be located at a second location 120B, or another suitable location.

Figure 5:
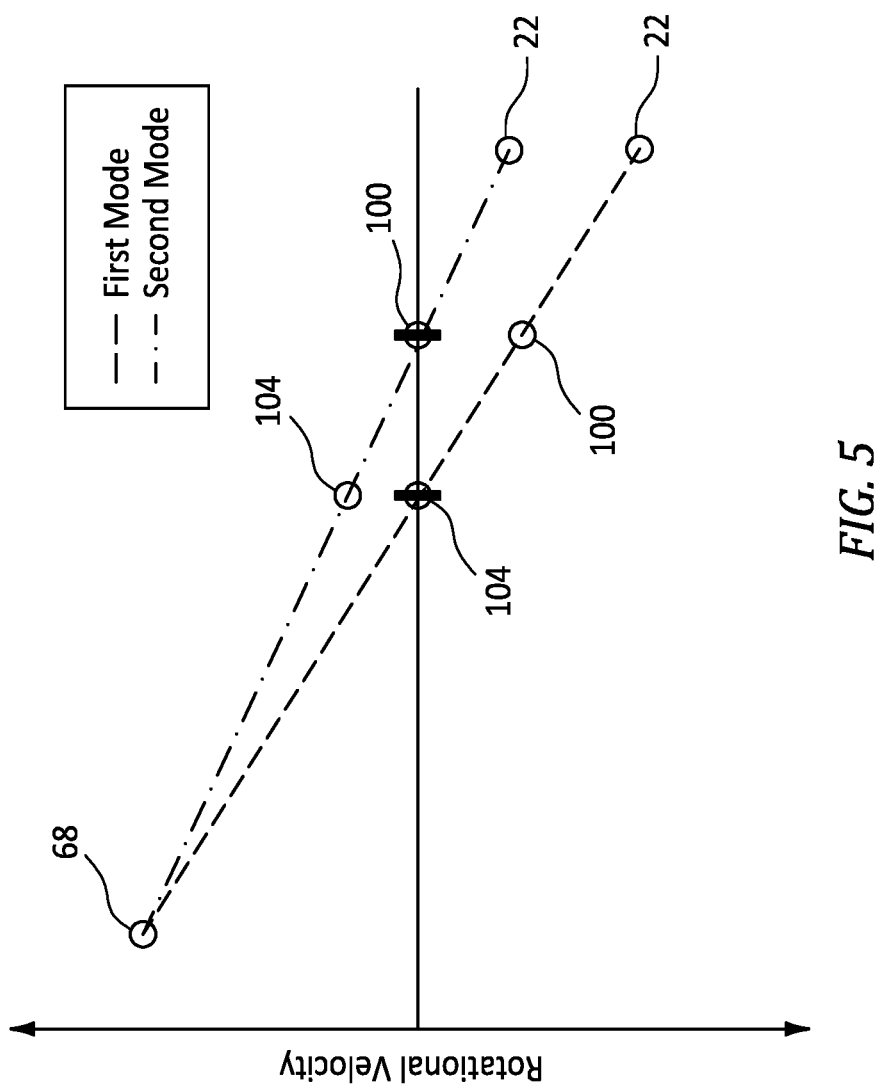
FIG. 5 is a graph depicting changes to rotational speeds during various modes of propulsion system operation.

The first brake 116A of FIG. 2 is configured to brake (e.g., slow and/or stop) rotation of the first carrier 104 about the axis 28, 40, 106. The second lock device 118B is configured to lock (e.g., fix, prevent) rotation of the first ring gear 100 and the second carrier 114 about the axis 28, 40, 106, for example, following the braking of the second carrier 114 to a zero rotational speed about the axis 28, 40, 106 using the second brake 116B. When the second carrier 114 is rotationally fixed (e.g., during the second mode of operation of FIG. 5), a rotational speed of the first propulsor rotor 22 may decrease (compared to when the second carrier 114 is free to rotate).

Reducing the rotational speed of the first propulsor rotor 22 during, for example, the second mode of operation reduces or substantially eliminates (e.g., de minimis) the first direction propulsive thrust generated by the first propulsor rotor 22. Reducing first propulsor rotor thrust may, in turn, increase power available for driving rotation of the second propulsor rotor 24 and/or facilitate substantial second direction aircraft movement; e.g., without first direction aircraft movement. However, maintaining some rotation of the first propulsor rotor 22 may maintain lubrication of one or more bearings (e.g., bearings 122 in FIG. 2) supporting the first propulsor rotor 22 and/or prevent bearing related damage. For example, when a component supported by a bearing is not rotating, shock loads may damage one of more internal components of the bearing. Examples of such bearing damage may include, but are not limited to, brinelling and false brinelling. Maintaining some rotation of the first propulsor rotor 22 of FIG. 1 may also or alternatively prevent an exhaust backflow through the bypass flowpath 56 into the core inlet 42. Maintaining some rotation of the first propulsor rotor 22 may still also or alternatively prevent debris (e.g., sand, dirt, dust, etc.) from entering the core inlet 42 during the second mode of operation where the aircraft is more likely to be near the ground; e.g., for landing or takeoff.

The second brake 116B of FIG. 2 is configured to brake (e.g., slow and/or stop) rotation of the first ring gear 100 about the axis 28, 40, 106 and, thus, rotation of the second carrier 114 about the axis 28, 40, 106. The first lock device 118A is configured to lock (e.g., fix, prevent) rotation of the first carrier 104 about the axis 28, 40, 106. With this arrangement, the geartrain 72 and its first gear system 94 and its second gear system 96 are configured to transfer additional power from the low speed rotating assembly 68 and its LPT rotor 60 to the first propulsor rotor 22 and any drivetrain element(s) therebetween (when included). This power transfer may be substantially all (e.g., minus losses in the drivetrain 70) of the power output from the low speed rotating assembly 68 and its LPT rotor 60 when the second propulsor rotor 24 is rotationally decoupled from the low speed rotating assembly 68; e.g., using the transmission 76 of FIG. 1. The geartrain 72 may thereby provide a multi-speed transmission between the low speed rotating assembly 68 and the first propulsor rotor 22, where a speed ratio between the low speed rotating assembly 68 and the first propulsor rotor 22 during the second mode is less than a speed ratio between the low speed rotating assembly 68 and the first propulsor rotor 22 during the first mode.

To enter the third mode of operation from the first mode of operation, the first lock device 118A may be disengaged and/or the first brake 116A may be released (if currently applied). The second propulsor rotor 24 may thereby begin to rotate along with the already rotating first propulsor rotor 22. Similarly, to enter the third mode of operation from the second mode of operation, the second lock device 118B may be disengaged and/or the second brake 116B may be released (if currently applied). The first propulsor rotor 22 may thereby begin to rotate faster along with the already rotating second propulsor rotor 24. When both of the first propulsor rotor 22 and the second propulsor rotor 24 are rotating/free to rotate, the drivetrain 70 may transfer (e.g., all, minus losses in the drivetrain 70) the power output from the low speed rotating assembly 68 and its LPT rotor 60 to (a) the first propulsor rotor 22 and the drivetrain element(s) therebetween and (b) the second propulsor rotor 24 and the drivetrain element(s) therebetween (e.g., independent of the geartrain 72 and its first gear system 94 and its second gear system 96).

Referring to FIG. 6, the first brake 116A and/or the second brake 116B may each be configured as or otherwise include a disk brake 124. The disk brake 124 of FIG. 6 includes a brake rotor 126 and one or more brake pads 128. The brake rotor 126 is configured rotatable with the respective geartrain member 104, 100. The brake rotor 126, for example, may be connected to and rotatable with the respective geartrain member 104, 100, or another rotating element (directly or indirectly) rotatable with the respective geartrain member 104, 100. The brake pads 128 are anchored to a stationary structure 130, which may be part of the engine housing 50 and/or an airframe of the aircraft (see FIG. 1). The brake pads 128 may be actuated by one or more brake actuators 132 (e.g., hydraulic brake actuators) to move the brake pads 128 from an open position to a closed position. In the open position, the brake pads 128 are spaced from and do not engage (e.g., contact) the brake rotor 126 (see position of FIG. 6). In the closed position, the brake pads 128 engage (e.g., contact) and clamp onto (e.g., squeeze) the brake rotor 126. Frictional rubbing between the brake pads 128 and the brake rotor 126 is operable to brake rotation of the brake rotor 126 and, thus, the respective geartrain member 104, 100 (or another rotating element) connected thereto. The first and the second brakes 116 of the present disclosure, however, are not limited to such an exemplary disk brake configuration. For example, it is contemplated the first and/or the second brake 116B may alternatively be configured as another type of brake such as a drum brake or a set of clutch plates.

Figure 7:
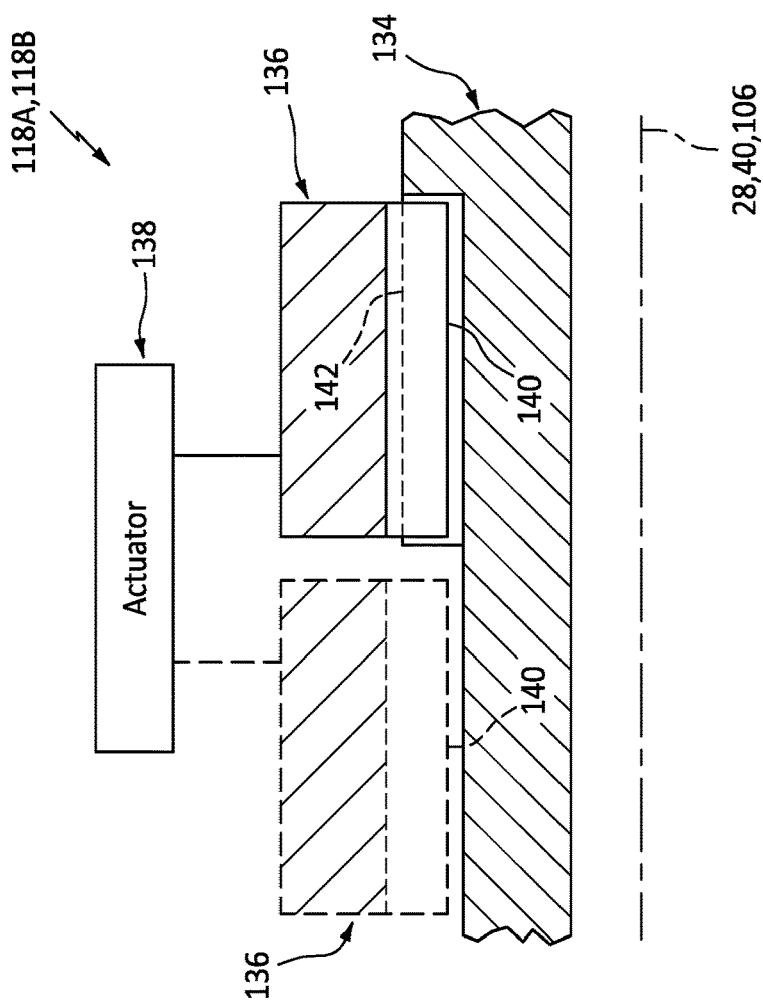
FIG. 7 is a partial, side sectional schematic illustration of a lock device.

Referring to FIG. 7, the first lock device 118A and/or the second lock device 118B may each be configured as a splined lock device; e.g., a splined coupling. The lock device 118 of FIG. 7, for example, includes an inner lock element 134 (e.g., a splined shaft), an outer lock element 136 (e.g., a splined sleeve) and an actuator 138. The inner lock element 134 is rotatable about the axis 28, 40, 106. The outer lock element 136 is rotationally fixed about the axis 28, 40, 106. However, the actuator 138 is configured to move (e.g., axially translate) the outer lock element 136 along the axis 28, 40, 106 and the inner lock element 134 between an unlocked position (see dashed line in FIG. 7) and a locked position (see solid line in FIG. 7; see also FIG. 8). At the unlocked position, inner splines 140 of the outer lock element 136 are disengaged (e.g., spaced) from outer splines 142 of the inner lock element 134. At the locked position, the inner splines 140 of the outer lock element 136 are engaged (e.g., meshed) with the outer splines 142 of the inner lock element 134 (see also FIG. 8). With this arrangement, when the lock device 118 is unlocked and its outer lock element 136 is in the unlocked position, the inner lock element 134 may rotate (e.g., freely, unencumbered by the outer lock element 136) about the axis 28, 40, 106. However, when the lock device 118 is locked and its outer lock element 136 is in the locked position of FIG. 8, the outer lock element 136 is meshed with the inner lock element 134 and prevents rotation of the inner lock element 134 about the axis 28, 40, 106.

Figure 8:
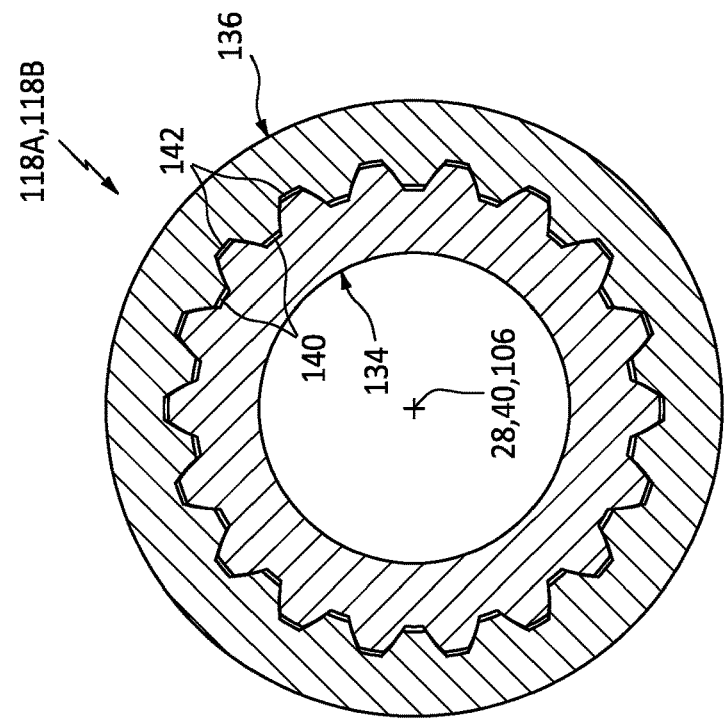
FIG. 8 is a cross-sectional illustration of the lock device of FIG. 7.

Referring to FIGS. 2 and 7, the inner lock element 134 of the first lock device 118A may be configured as part of or may be attached (directly or indirectly) to the first carrier 104, or any other element rotatable therewith. The inner lock element 134 of the second lock device 118B may be configured as part of or may be attached (directly or indirectly) to the first ring gear 100, or any other element rotatable therewith. While the inner lock element 134 of FIGS. 7 and 8 is described as the rotating element and the outer lock element 136 is described as the rotationally fixed element, the operation of these elements may be switched in other embodiments. In particular, the inner lock element 134 may alternatively be configured as the rotationally fixed element and axially translatable by the actuator 138, and the outer lock element 136 may be configured as the rotating element. Furthermore, various other types of rotational lock devices are known in the art, and the present disclosure is not limited to any particular ones thereof.

Figure 9:
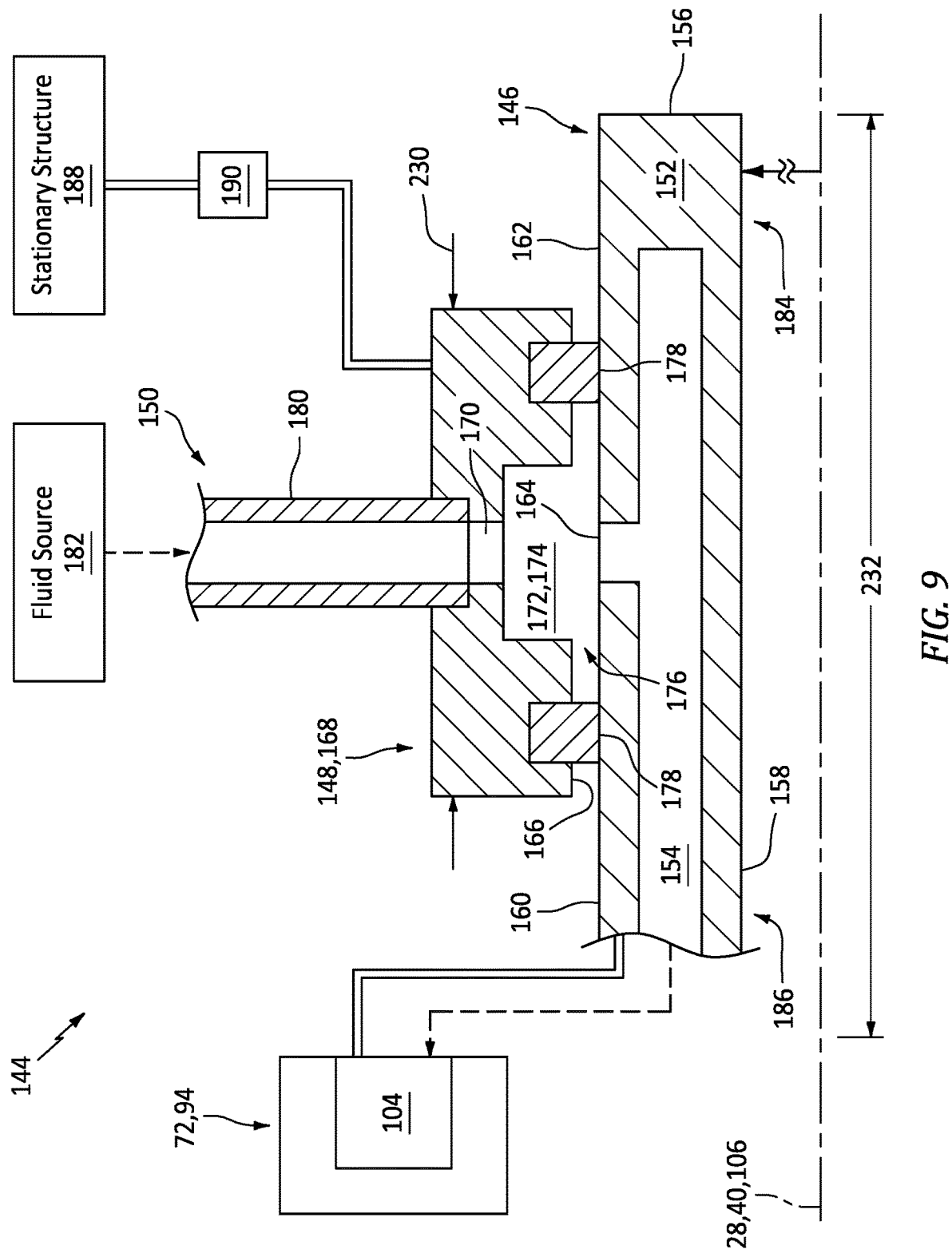
FIG. 9 is a partial, side sectional schematic illustration of a first engine assembly for aircraft propulsion system.

FIG. 9 partially illustrates a first engine assembly 144 of the aircraft propulsion system 20 and its turbine engine for supporting operation of the geartrain 72 and its first gear system 94. This first engine assembly 144 includes the geartrain 72, a first rotating structure 146 and a first support structure 148. The first engine assembly 144 of FIG. 9 also a first fluid circuit 150 (e.g., a lubricant circuit) configured to deliver fluid (e.g., lubricant) to one or more components of the geartrain 72 and, more particularly, the first gear system 94.

The first rotating structure 146 may form, or may otherwise be connected to and rotatable with, a first component of the geartrain 72 and its first gear system 94. The first rotating structure 146 of FIG. 9, for example, forms the first carrier 104. The first rotating structure 146 of FIG. 9, in particular, includes the first carrier 104, a rotating structure shaft 152 and an internal first rotating structure passage 154.

The rotating structure shaft 152 is connected to (e.g., formed integral with or otherwise fixedly attached to) and rotatable with the first carrier 104. This rotating structure shaft 152 of FIG. 9 projects axially out (e.g., in an aft direction away from the geartrain 72 and its first gear system 94, and towards the LPT rotor 60 of FIG. 2) from the first carrier 104 along the axis 28, 40, 106 to an axial distal end 156 of the first rotating structure 146 and its rotating structure shaft 152. The rotating structure shaft 152 extends radially from a radial inner side 158 of the first rotating structure 146 and its rotating structure shaft 152 to a radial outer side 160 of the rotating structure shaft 152. The rotating structure shaft 152 has a first fluid device land 162; e.g., a cylindrical outer surface. The first fluid device land 162 is disposed axially at or about the rotating structure distal end 156. The first fluid device land 162 is radially disposed at the shaft outer side 160.

The first rotating structure passage 154 includes a first inlet port 164 (or multiple first inlet ports arranged circumferentially about the axis 28, 40, 106) at the shaft outer side 160. The first inlet port 164 of FIG. 9, in particular, forms an inlet opening to the first rotating structure passage 154 in the first fluid device land 162. The first rotating structure passage 154 of FIG. 9 is disposed within the first rotating structure 146 and its rotating structure shaft 152. This first rotating structure passage 154 extends (e.g., axially) within the first rotating structure 146 and its rotating structure shaft 152 away from its first inlet port 164 and towards the geartrain 72 and its first gear system 94.

The first support structure 148 is disposed radially outboard of the rotating structure shaft 152, where a radial inner side 166 of the first support structure 148 radially faces the shaft outer side 160. The first support structure 148 extends axially along and circumferentially about the axis 28, 40, 106 and the rotating structure shaft 152. The first support structure 148 thereby axially overlaps and circumscribes the rotating structure shaft 152. The first support structure 148 of FIG. 9 is configured as or otherwise includes a first fluid device 168.

The first fluid device 168 may be configured as or otherwise include a fluid coupling, a fluid damper and/or a fluid bearing. The first fluid device 168 of FIG. 9, for example, includes a first support structure passage 170 and an annular first channel 172. The first support structure passage 170 extends radially (in a radial inward direction towards the axis 28, 40, 106) into the first support structure 148 and its first fluid device 168 to the first channel 172. The first channel 172 extends radially (in a radial outward direction away from the axis 28, 40, 106) into the first support structure 148 and its first fluid device 168 to the first support structure passage 170. This first channel 172 extends axially within the first support structure 148 and its first fluid device 168 between opposing axial sidewalls, and may have a larger axial width than the first support structure passage 170. The first channel 172 extends within the first support structure 148 and its first fluid device 168 circumferentially about (e.g., completely around) the axis 28, 40, 106.

The first fluid device 168 is axially aligned with the rotating structure shaft 152 and its first fluid device land 162. The first fluid device 168 is also radially outboard of and radially adjacent (but, slightly radially spaced from) the rotating structure shaft 152 and its first fluid device land 162. With this arrangement, a first fluid plenum 174 (e.g., an annular lubricant plenum) is formed by and radially between the rotating structure shaft 152 and the first fluid device 168. This first fluid plenum 174 includes the first channel 172 as well as a radial first clearance gap 176 between an inner surface of the first fluid device 168 at its inner side 166 and the first fluid device land 162. The first fluid plenum 174 and its first clearance gap 176 are axially bounded by (e.g., extend axially between) a plurality of first seal elements 178 (e.g., annular seal elements, seal rings, etc.), where each first seal element 178 is radially between and engaged with the first fluid device 168 and the rotating structure shaft 152. With this arrangement, the first fluid plenum 174 fluidly couples the first support structure passage 170 to the first rotating structure passage 154.

The first fluid circuit 150 of FIG. 9 includes a first fluid conduit 180 (e.g., a lubricant conduit), the first rotating structure passage 154, the first support structure passage 170 and the first fluid plenum 174. The first fluid conduit 180 is fluidly coupled to the first support structure passage 170. The first fluid conduit 180 is configured to receive a flow of fluid such as lubricant from a fluid source 182 (e.g., a lubricant reservoir and/or a lubricant pump), and direct that fluid flow through the first support structure passage 170 and the first fluid plenum 174 and into the first rotating structure passage 154. The first rotating structure passage 154 may then facilitate delivery of the fluid flow to one or more components of the geartrain 72 and its first gear system 94; e.g., the first carrier 104 and the first intermediate gears 102 of FIG. 2. Here, the first fluid device 168 provides the fluid coupling between the stationary first fluid conduit 180 and the first rotating structure passage 154. The first fluid plenum 174 and its first channel 172 may be sized to provide fluidic damping for the first rotating structure 146 and its rotating structure shaft 152. Moreover, during rotation of the first rotating structure 146 and its rotating structure shaft 152, the first support structure 148 and its first fluid device 168 may provide at least some rotational support for the first rotating structure 146 and its rotating structure shaft 152. The rotating structure shaft 152 and the first fluid device 168 of FIG. 9, for example, may form a fluidic journal bearing.

With the foregoing arrangement, the rotating structure shaft 152 may be rotationally independent of other devices/structures within the aircraft propulsion system 20 and its turbine engine. For example, a portion 184 (e.g., an entirety) of the rotating structure shaft 152 which projects axially away from the first fluid device land 162 and/or the first fluid device 168 to the rotating structure distal end 156 may be rotationally unsupported; e.g., not supported by a bearing. Similarly, a portion 186 (e.g., an entirety) of the rotating structure shaft 152 axially between the first fluid device land 162 and/or the first fluid device 168 and the first carrier 104 may be rotationally unsupported; e.g., not supported by a bearing. This may reduce or eliminate a bending moment in the first rotating structure 146 that may otherwise by present if, for example, the rotating structure shaft 152 was also or alternatively rotationally supported by a bearing. However, rotational support for the first rotating structure 146 and its rotating structure shaft 152 may still be provided through the first stationary structure as described above.

The first support structure 148 may be connected to a stationary structure 188 of the aircraft propulsion system 20 through a compliant coupling 190; e.g., an axial or tangential squirrel cage coupling, a spring coupling, etc. This compliant coupling 190 is configured to facilitate (e.g., slight) radial movement between the first support structure 148 and the stationary structure 188, which may reduce bending moment loads, vibration loads, etc. on the first rotating structure 146.

Figure 10:
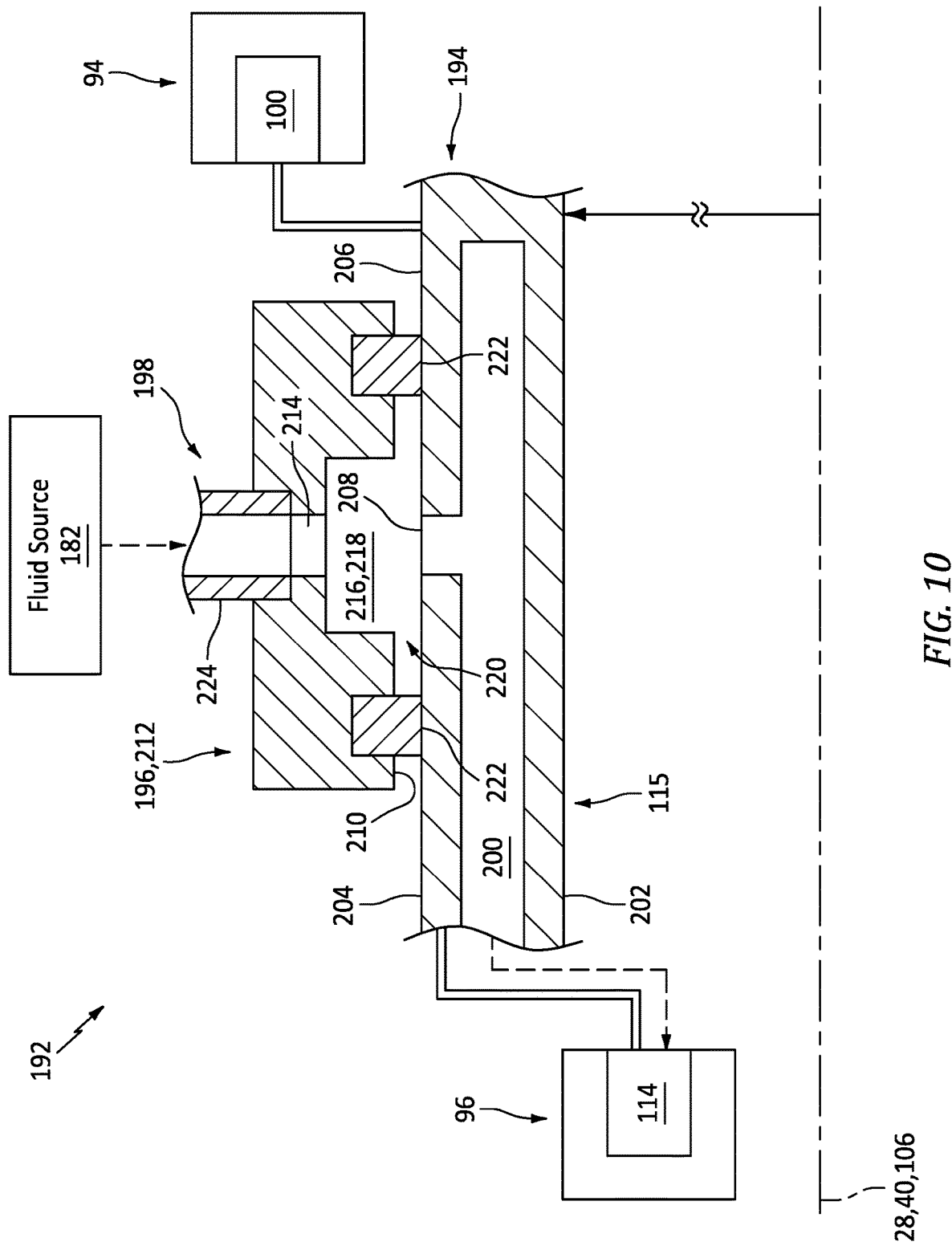
FIG. 10 is a partial, side sectional schematic illustration of a second engine assembly for aircraft propulsion system.

FIG. 10 partially illustrates a second engine assembly 192 of the aircraft propulsion system 20 and its turbine engine for supporting operation of the geartrain 72 and its second gear system 96. This second engine assembly 192 includes the geartrain 72, a second rotating structure 194 and a second support structure 196. The second engine assembly 192 of FIG. 10 also a second fluid circuit 198 (e.g., a lubricant circuit) configured to deliver fluid (e.g., lubricant) to one or more components of the geartrain 72 and, more particularly, the second gear system 96.

The second rotating structure 194 may form, or may otherwise be connected to and rotatable with, a second component of the geartrain 72 and its first gear system 94 and/or a third component of the geartrain 72 and its second gear system 96. The second rotating structure 194 of FIG. 10, for example, forms the first ring gear 100 and the second carrier 114. The second rotating structure 194 of FIG. 10, in particular, includes the first ring gear 100, the second carrier 114, the inter-gear system shaft 115 and an internal second rotating structure passage 200.

The inter-gear system shaft 115 is connected to (e.g., formed integral with or otherwise fixedly attached to) and rotatable with the first ring gear 100 and the second carrier 114. This inter-gear system shaft 115 of FIG. 10 extends axially along the axis 28, 40, 106. The inter-gear system shaft 115 extends radially from a radial inner side 202 of the inter-gear system shaft 115 to a radial outer side 204 of the inter-gear system shaft 115. The inter-gear system shaft 115 has a second fluid device land 206; e.g., a cylindrical outer surface. The second fluid device land 206 is radially disposed at the shaft outer side 204.

The second rotating structure passage 200 includes a second inlet port 208 (or multiple second inlet ports arranged circumferentially about the axis 28, 40, 106) at the shaft outer side 204. The second inlet port 208 of FIG. 10, in particular, forms an inlet opening to the second rotating structure passage 200 in the second fluid device land 206. The second rotating structure passage 200 of FIG. 10 is disposed within the second rotating structure 194 and its inter-gear system shaft 115. This second rotating structure passage 200 extends (e.g., axially) within the second rotating structure 194 and its inter-gear system shaft 115 away from its second inlet port 208 and towards the geartrain 72 and its second gear system 96.

The second support structure 196 is disposed radially outboard of the inter-gear system shaft 115, where a radial inner side 210 of the second support structure 196 radially faces the shaft outer side 204. The second support structure 196 extends axially along and circumferentially about the axis 28, 40, 106 and the inter-gear system shaft 115. The second support structure 196 thereby axially overlaps and circumscribes the inter-gear system shaft 115. The second support structure 196 of FIG. 10 is configured as or otherwise includes a second fluid device 212.

The second fluid device 212 may be configured as or otherwise include a fluid coupling, a fluid damper and/or a fluid bearing. The second fluid device 212 of FIG. 10, for example, includes a second support structure passage 214 and an annular second channel 216. The second support structure passage 214 extends radially (in the radial inward direction towards the axis 28, 40, 106) into the second support structure 196 and its second fluid device 212 to the second channel 216. The second channel 216 extends radially (in the radial outward direction away from the axis 28, 40, 106) into the second support structure 196 and its second fluid device 212 to the second support structure passage 214. This second channel 216 extends axially within the second support structure 196 and its second fluid device 212 between opposing axial sidewalls, and may have a larger axial width than the second support structure passage 214. The second channel 216 extends within the second support structure 196 and its second fluid device 212 circumferentially about (e.g., completely around) the axis 28, 40, 106.

The second fluid device 212 is axially aligned with the inter-gear system shaft 115 and its second fluid device land 206. The second fluid device 212 is also radially outboard of and radially adjacent (but, slightly radially spaced from) the inter-gear system shaft 115 and its second fluid device land 206. With this arrangement, a second fluid plenum 218 (e.g., an annular lubricant plenum) is formed by and radially between the inter-gear system shaft 115 and the second fluid device 212. This second fluid plenum 218 includes the second channel 216 as well as a radial second clearance gap 220 between an inner surface of the second fluid device 212 at its inner side 210 and the second fluid device land 206. The second fluid plenum 218 and its second clearance gap 220 are axially bounded by (e.g., extend axially between) a plurality of second seal elements 222 (e.g., annular seal elements, seal rings, etc.), where each second seal element 222 is radially between and engaged with the second fluid device 212 and the inter-gear system shaft 115. With this arrangement, the second fluid plenum 218 fluidly couples the second support structure passage 214 to the second rotating structure passage 200.

The second fluid circuit 198 of FIG. 10 includes a second fluid conduit 224 (e.g., a lubricant conduit), the second rotating structure passage 200, the second support structure passage 214 and the second fluid plenum 218. The second fluid conduit 224 is fluidly coupled to the second support structure passage 214. The second fluid conduit 224 is configured to receive a flow of the fluid from the fluid source 182, and direct that fluid flow through the second support structure passage 214 and the second fluid plenum 218 and into the second rotating structure passage 200. The second rotating structure passage 200 may then facilitate delivery of the fluid flow to one or more components of the geartrain 72 and its second gear system 96; e.g., the second carrier 114 and the second intermediate gears 112 of FIG. 2. Here, the second fluid device 212 provides the fluid coupling between the stationary second fluid conduit 224 and the second rotating structure passage 200. The second fluid plenum 218 and its second channel 216 may be sized to provide fluidic damping for the second rotating structure 194 and its inter-gear system shaft 115. Moreover, during rotation of the second rotating structure 194 and its inter-gear system shaft 115, the second support structure 196 and its second fluid device 212 may provide at least some rotational support for the second rotating structure 194 and its inter-gear system shaft 115. The inter-gear system shaft 115 and the second fluid device 212 of FIG. 10, for example, may form a fluidic journal bearing.

In the first and third operating modes, the first carrier 104 and the first rotating structure 146 may be static, while the second carrier 114 and the second rotating structure 194 may rotate. In the second operating mode, the first carrier 104 and the first rotating structure 146 may rotate, while the second carrier 114 and the second rotating structure 194 may be static. Therefore, during all three modes one of the two fluid devices 168 and 212 may operate as a static fluid damper while the other may operate as a fluid bearing, so the combined system may have both of these functions in each mode.

Figure 12:
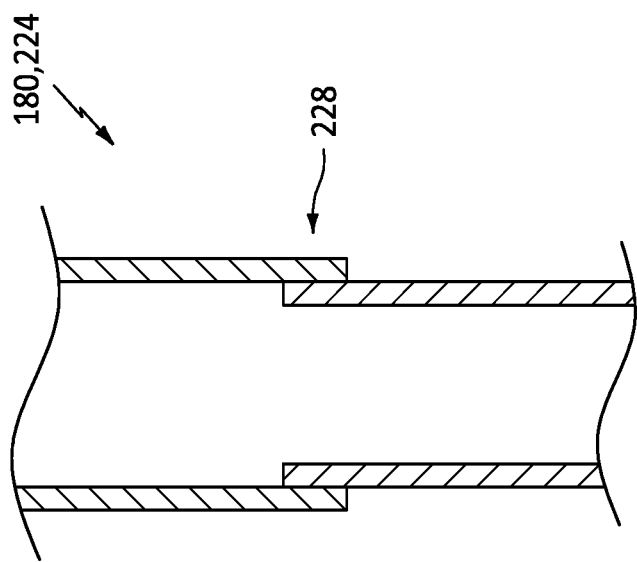
FIGS. 11 and 12 are illustrations of portions of a fluid conduit with various radial compliant sections.
Figure 11:
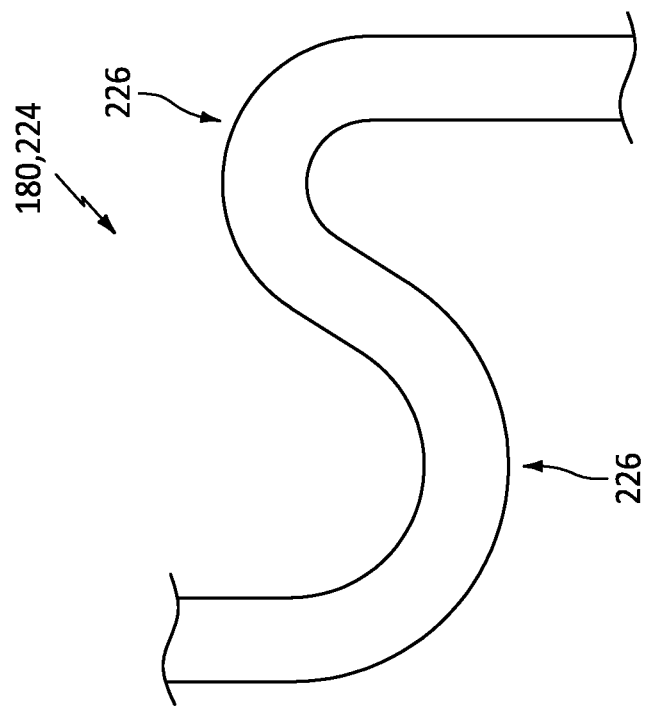

In some embodiments, referring to FIG. 11, the fluid conduit 180, 224 may be configured with one or more bends 226. These bends 226 may be provided to facilitate the radial compliance/movement between the respective support structure 148, 196 and the stationary structure 188 of FIG. 9, 10. Referring to FIG. 12, the fluid conduit 180, 224 may also or alternatively be provided with a slip joint 228 to facilitate the radial compliance/movement between the respective support structure 148, 196 and the stationary structure 188 of FIG. 9, 10.

Referring to FIG. 9, the first support structure 148 and its first fluid device 168 have an axial length 230 measured between opposing axial sides of the first support structure 148. The rotating structure shaft 152 has an axial length 232 measured between, for example, the first carrier 104 and the rotating structure distal end 156. In some embodiments, the shaft axial length 232 may be equal to or less than three times (3×) the support structure axial length 230; e.g., equal to or less than one and one-half times (1.5×) or two times (2×) the support structure axial length 230.

In some embodiments, referring to FIG. 2, the first sun gear 98 and the second sun gear 108 may each be independently connected (e.g., connected in parallel) to the low speed rotating assembly 68 and its low speed shaft 66. In other embodiments, however, the second sun gear 108 may be connected to the low speed rotating assembly 68 and its low speed shaft 66 through the first sun gear 98. The second sun gear 108, for example, may be rotationally fixed to the first sun gear 98. In still other embodiments, the first sun gear 98 may be connected to the low speed rotating assembly 68 and its low speed shaft 66 through the second sun gear 108. The first sun gear 98, for example, may be rotationally fixed to the second sun gear 108.

In some embodiments, referring to FIG. 2, the low speed rotating assembly 68 and its low speed shaft 66 may be connected to the transmission 76 (see FIG. 1) and, thus, the second propulsor rotor 24 independent of (e.g., in parallel with) geartrain 72. In other embodiments, however, the transmission 76 and, thus, the second propulsor rotor 24 may be coupled to the low speed rotating assembly 68 and its low speed shaft 66 through the first sun gear 98 or the second sun gear 108, but not though the rest of the first gear system 94 and the second gear system 96. Thus, while power may be transferred from the low speed rotating assembly 68 to the second propulsor rotor 24 through the sun gear(s) 98 and/or 108, the output from the geartrain 72 to the transmission 76 may still rotate with the low speed rotating assembly 68 at a common rotational velocity.

Figure 13:
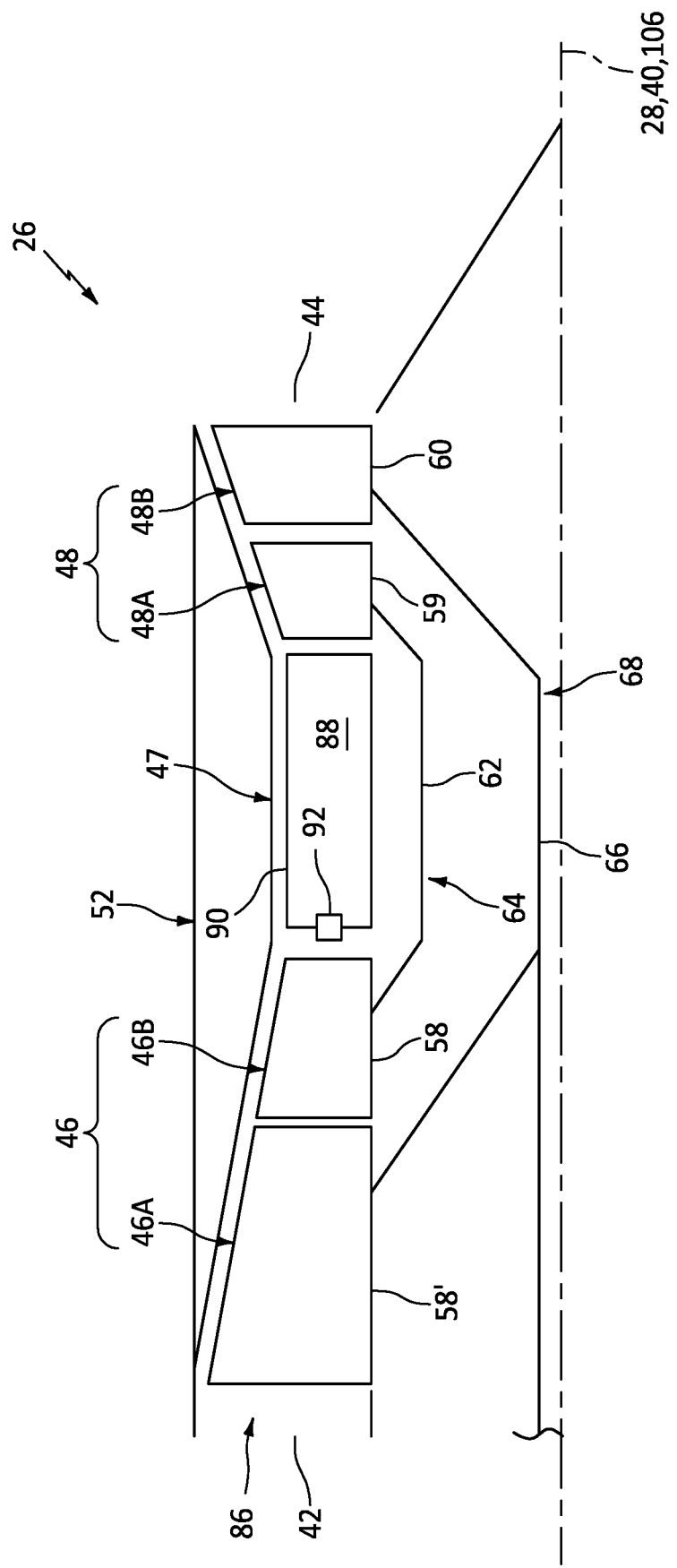
FIG. 13 is a partial, schematic illustration of a gas turbine engine core.

In some embodiments, referring to FIG. 1, the low speed rotating assembly 68 may be configured without a compressor rotor. In other embodiments, referring to FIG. 13, the low speed rotating assembly 68 may include a low pressure compressor (LPC) rotor 58' arranged within a low pressure compressor (LPC) section 46A of the compressor section 46. In such embodiments, the compressor rotor 58 may be a high pressure compressor (HPC) rotor 58 within a high pressure compressor (HPC) section 46B of the compressor section 46.

Figure 14:
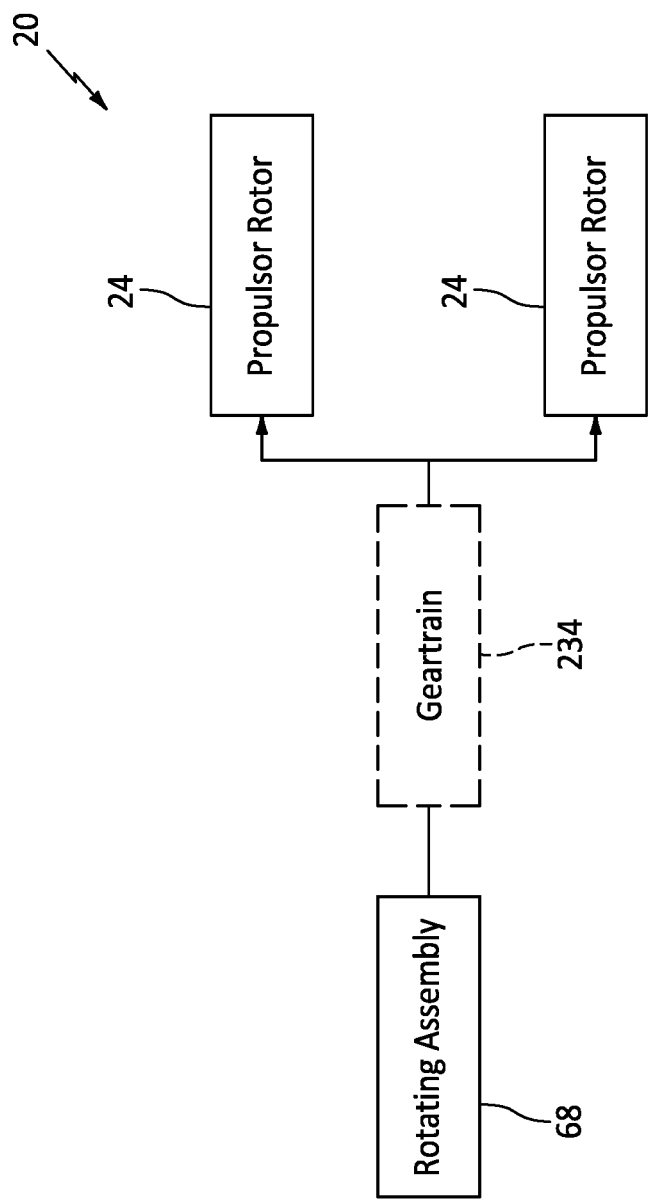
FIG. 14 is a partial, schematic illustration of a rotating structure coupled to and driving multiple propulsor rotors for generating propulsive lift.

The engine core 26 (e.g., see FIG. 1) may have various configurations other than those described above. The engine core 26, for example, may be configured with a single spool, with two spools (e.g., see FIGS. 1 and 13), or with more than two spools. The engine core 26 may be configured with one or more axial flow compressor sections, one or more radial flow compressor sections, one or more axial flow turbine sections and/or one or more radial flow turbine sections. The engine core 26 may be configured with any type or configuration of annular, tubular (e.g., CAN), axial flow and/or reverser flow combustor. The present disclosure therefore is not limited to any particular types or configurations of gas turbine engine cores. Furthermore, it is contemplated the engine core 26 of the present disclosure may drive more than the two propulsor rotors 22 and 24, or a single one of the propulsor rotors 22, 24 and/or one or more other mechanical loads; e.g., electric machines, electric generators, electric motors, etc. The aircraft propulsion system 20, for example, may include two or more of the first propulsor rotors 22 and/or two or more of the second propulsor rotors 24. For example, the aircraft propulsion system 20 of FIG. 14 includes multiple second propulsor rotors 24 rotatably driven by the low speed rotating assembly 68. These second propulsor rotors 24 may rotate about a common axis. Alternatively, each second propulsor rotor 24 may rotate about a discrete axis where, for example, the second propulsor rotors 24 are laterally spaced from one another and coupled to the low speed rotating assembly 68 through a power splitting geartrain 234.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An engine assembly, comprising:
a geartrain including a sun gear, a ring gear, a plurality of intermediate gears and a carrier, the sun gear rotatable about an axis, the ring gear rotatable about the axis and circumscribing the sun gear, the plurality of intermediate gears arranged circumferentially about the axis in an array, each of the plurality of intermediate gears radially between and meshed with the sun gear and the ring gear, each of the plurality of intermediate gears rotatably mounted to the carrier, and the carrier rotatable about the axis;
a rotating structure forming the carrier, the rotating structure including a shaft and a rotating structure passage; and
a support structure circumscribing the shaft with a plenum formed by and radially between the support structure and the shaft, the support structure comprising a support structure passage, and the plenum fluidly coupling the support structure passage to the rotating structure passage.

2. The engine assembly of claim 1, further comprising:
a lubricant circuit configured to deliver lubricant to the geartrain;
the lubricant circuit including the support structure passage, the plenum and the rotating structure passage.

3. The engine assembly of claim 1, further comprising
a lubricant conduit coupled to the support structure;
the lubricant conduit configured to direct lubricant through the support structure passage and the plenum into the rotating structure passage.

4. The engine assembly of claim 1, wherein the support structure is configured as a fluid damper for the shaft.

5. The engine assembly of claim 1, further comprising a journal bearing including the shaft and the support structure.

6. The engine assembly of claim 1, further comprising:
a first seal element radially between and engaging the shaft and the support structure; and
a second seal element radially between and engaging the shaft and the support structure, the plenum extending axially between the first seal element and the second seal element.

7. The engine assembly of claim 1, wherein
the plenum comprises an annular channel radially outboard and adjacent the shaft; and
the annular channel extends radially into and axially within the support structure.

8. The engine assembly of claim 1, further comprising:
a stationary structure;
the support structure connected to the stationary structure through a compliant coupling.

9. The engine assembly of claim 8, wherein the compliant coupling is configured to facilitate radial shifting between the support structure and the stationary structure.

10. The engine assembly of claim 1, wherein
the support structure has a support structure axial length; and
the shaft has a shaft axial length that is equal to or less than three times the support structure axial length.

11. The engine assembly of claim 1, wherein a portion of the shaft which projects axially away from the support structure to a distal end of the shaft is rotationally unsupported.

12. The engine assembly of claim 1, wherein a portion of the shaft axially between the support structure and the carrier is rotationally unsupported.

13. The engine assembly of claim 1, further comprising:
a second rotating structure forming the ring gear, the second rotating structure comprising a second rotating structure passage; and
a second support structure circumscribing the second rotating structure with a second plenum formed by and radially between the second support structure and the second rotating structure, the second support structure comprising a second support structure passage, and the second plenum fluidly coupling the second support structure passage to the second rotating structure passage.

14. The engine assembly of claim 13, wherein at least one of
during one mode of operation, the second rotating structure and the second rotating structure passage are configured to rotate about the axis while the first rotating structure and the first rotating structure passage are stationary; or
during another mode of operation, the first rotating structure and the first rotating structure passage are configured to rotate about the axis while the second rotating structure and the second rotating structure passage are stationary.

15. The engine assembly of claim 13, wherein the geartrain further includes
a second sun gear rotatable about the axis;
a second ring gear rotatable about the axis and circumscribing the second sun gear;
a plurality of second intermediate gears arranged circumferentially about the axis in a second array, each of the plurality of second intermediate gears radially between and meshed with the second sun gear and the second ring gear; and
a second carrier rotatable about the axis, each of the plurality of second intermediate gears rotatably mounted to the second carrier, and the second rotating structure further forming the second carrier.

16. The engine assembly of claim 15, further comprising:
a lubricant circuit configured to deliver lubricant to the geartrain;
the lubricant circuit including the second support structure passage, the second plenum and the second rotating structure passage.

17. The engine assembly of claim 1, further comprising:
a propulsor rotor; and
a rotating assembly comprising a turbine rotor, the rotating assembly configured to drive rotation of the propulsor rotor through the geartrain.

18. An engine assembly, comprising:
a geartrain;
a first rotating structure rotatable about an axis, the first rotating structure forming a first component of the geartrain, and the first rotating structure comprising a first rotating structure passage;
a first support structure circumscribing the first rotating structure with a first plenum formed by and radially between the first support structure and the first rotating structure, the first support structure comprising a first support structure passage, and the first plenum fluidly coupling the first support structure passage to the first rotating structure passage;
a second rotating structure rotatable about the axis, the second rotating structure forming a second component of the geartrain, and the second rotating structure comprising a second rotating structure passage; and
a second support structure circumscribing the second rotating structure with a second plenum formed by and radially between the second support structure and the second rotating structure, the second support structure comprising a second support structure passage, and the second plenum fluidly coupling the second support structure passage to the second rotating structure passage.

19. The engine assembly of claim 18, wherein at least one of the first component of the geartrain comprises a carrier of the geartrain; or
the second component of the geartrain comprises a ring gear of the geartrain.

20. An engine assembly, comprising:
a geartrain comprising an epicyclic gear system;
a rotating structure rotatable about an axis, the rotating structure forming a first component of the epicyclic gear system, and the rotating structure comprising a rotating structure passage;
a support structure circumscribing the rotating structure with a plenum formed by and radially between the support structure and the rotating structure, the support structure comprising a support structure passage, and the plenum fluidly coupling the support structure passage to the rotating structure passage; and a lubricant circuit configured to deliver lubricant to the epicyclic gear system, the lubricant circuit including the support structure passage, the plenum and the rotating structure passage.

\* \* \* \* \*